United States Patent
Suh et al.

(10) Patent No.: US 9,524,420 B2
(45) Date of Patent: Dec. 20, 2016

(54) USER AUTHENTICATION METHOD AND APPARATUS

(71) Applicant: Samsung Electronics Co., Ltd., Suwon-Si, Gyeonggi-Do (KR)

(72) Inventors: Sung Joo Suh, Seoul (KR); Nam Joon Kim, Anyang-si (KR); Hyun Jeong Lee, Hwaseong-si (KR); Jae Joon Han, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 67 days.

(21) Appl. No.: 14/561,757

(22) Filed: Dec. 5, 2014

(65) Prior Publication Data

US 2015/0205998 A1 Jul. 23, 2015

(30) Foreign Application Priority Data

Jan. 23, 2014 (KR) .................. 10-2014-0008203

(51) Int. Cl.
*G06K 9/48* (2006.01)
*G06K 9/00* (2006.01)
*G06K 9/62* (2006.01)
*G06K 9/46* (2006.01)

(52) U.S. Cl.
CPC ......... *G06K 9/00281* (2013.01); *G06K 9/6212* (2013.01); *G06K 9/6244* (2013.01); *G06K 2009/4695* (2013.01)

(58) Field of Classification Search
CPC ............ G06K 9/00228; G06K 9/00221; G06K 9/00281; G06K 9/00248; G06K 9/6244; G06K 9/6212; G06K 2009/4695
USPC ................ 382/100, 115, 118, 155, 159, 181, 190,382/195, 299, 276, 293, 298, 260, 254, 205,382/197, 224; 707/705, 736, 737; 704/200, 201, 704/221, 222
See application file for complete search history.

(56) References Cited

U.S. PATENT DOCUMENTS

| 7,127,087 | B2* | 10/2006 | Huang ............... G06K 9/00228 340/5.52 |
| 7,231,657 | B2 | 6/2007 | Honarvar et al. |
| 7,292,737 | B2 | 11/2007 | Zhou et al. |
| 7,512,255 | B2 | 3/2009 | Kakadiaris et al. |
| 8,270,684 | B2 | 9/2012 | Kiyohara et al. |

(Continued)

FOREIGN PATENT DOCUMENTS

| KR | 2010-0026361 A | 3/2010 |
| KR | 2012-0058538 A | 6/2012 |

(Continued)

OTHER PUBLICATIONS

A.J. Wright, "Robust Face Recognition via Sparse Representation via Sparse Representation", IEEE, Transactions on Pattern Analysis and Machine Intelligence, 2009, 18pgs, vol. 31, No. 2.

(Continued)

*Primary Examiner* — Sheela C Chawan
(74) *Attorney, Agent, or Firm* — Harness, Dickey & Pierce, P.L.C.

(57) ABSTRACT

A user authentication method includes extracting a facial landmark from each of a first input image and a second input image; generating a first sparse code of the facial landmark extracted from the first input image and a second sparse code of the facial landmark extracted from the second input image; and determining whether a user is to be authenticated based on the first sparse code of the first input image and the second sparse code of the second input image.

15 Claims, 7 Drawing Sheets

(56) References Cited

U.S. PATENT DOCUMENTS

| | | | |
|---|---|---|---|
| 8,913,839 B2* | 12/2014 | Ricanek, Jr. | G06K 9/00221 |
| | | | 382/159 |
| 9,082,235 B2* | 7/2015 | Lau et al. | G07C 9/00 |
| 2010/0329517 A1 | 12/2010 | Zhang et al. | |
| 2011/0228054 A1 | 9/2011 | Gao et al. | |
| 2011/0317129 A1 | 12/2011 | Hsu et al. | |
| 2012/0288167 A1* | 11/2012 | Sun | G06K 9/00281 |
| | | | 382/118 |
| 2014/0267413 A1* | 9/2014 | Du | G06T 13/40 |
| | | | 345/633 |

FOREIGN PATENT DOCUMENTS

| | | |
|---|---|---|
| KR | 20120119905 A | 10/2012 |
| KR | 20130003135 A | 1/2013 |
| KR | 10-1301301 B1 | 8/2013 |

OTHER PUBLICATIONS

H. Lee, "Efficient Sparse Coding Algorithms," in NIPS, 2006/2007, 8pgs, Stanford, CA.

* cited by examiner

USER AUTHENTICATION METHOD AND APPARATUS

CROSS-REFERENCE TO RELATED APPLICATION

This application claims the priority benefit of Korean Patent Application No. 10-2014-0008203, filed on Jan. 23, 2014, in the Korean Intellectual Property Office, the disclosure of which is incorporated herein by reference in its entirety.

BACKGROUND

1. Field

Example embodiments relate to technology for performing a user authentication using an image including a face of the user.

2. Description of the Related Art

Recently, technology for a user recognition and authentication has been continuously developed according to an increase in an attention to security for mobile devices and an access to secure locations. A mobile device for performing user authentication based on a fingerprint verification scheme has been already commercialized, and technology for performing user authentication using an image captured by a user is being applied to mobile devices.

In general, an unlock function of a personal terminal and/or mobile device is performed by inputting a pattern through a touch screen input of the personal terminal. Some user authentication protocols are performed using a captured image of a user, where the user may use the unlock function of the personal terminal by gazing at the personal terminal. Also, in an environment requiring stringent security measures such as entry into a secure location, overall security may be enhanced through an application of technology for performing a face authentication by capturing an image of a user.

SUMMARY

At least one example embodiment relates to a user authentication method.

According to an example embodiment a user authentication method includes extracting a facial landmark from each of a first input image and a second input image; generating a first sparse code of the facial landmark extracted from the first input image and a second sparse code of the facial landmark extracted from the second input image; and determining whether a user is to be authenticated based on the first sparse code of the first input image and the second sparse code of the second input image.

Example embodiments provide that the generating may include determining a first feature vector set associated with the facial landmark extracted from the first input image and a second feature vector set associated with the facial landmark extracted from the second input image, the first feature vector set and the second feature vector set being generated based on learning data.

Example embodiments provide that the generating may include generating the first sparse code using the first feature vector set; and generating the second sparse code using the second feature vector set.

Example embodiments provide that the generating may include generating a first feature vector for the facial landmark extracted from the first input image based on an area surrounding the facial landmark; generating a second feature vector for the facial landmark extracted from the second input image based on an area surrounding the facial landmark; generating the first sparse code for the facial landmark extracted from the first input image using the first feature vector set and the generated first feature vector; and generating the second sparse code for the facial landmark extracted from the second input image using the second feature vector set and the generated second feature vector.

Example embodiments provide that the extracting extracts a plurality of facial landmarks from the first input image and the second input image. Example embodiments provide that the generating may include generating the first sparse code for each of the plurality of facial landmarks extracted from the first input image; and generating the second sparse code for each of the plurality of facial landmarks extracted from the second input image.

Example embodiments provide that the determining may include determining whether a user represented in the first input image is similar to a user represented in the second input image based on a calculated similarity between the first sparse code and the second sparse code.

Example embodiments provide that the determining may include calculating a similarity between the first sparse code and the second sparse code; determining a final similarity based on the calculated similarity; and determining whether a user represented in the first input image is similar or identical to a user represented in the second input image based on whether the final similarity satisfies a desired condition.

Example embodiments provide that the calculating may include calculating the similarity between the first sparse code and the second sparse code through one of a cosine distance measurement and a chi-square distance measurement.

Example embodiments provide that the facial landmark may include at least one of both ends of an eye, both ends of an eyebrow, a tip of a nose, and both corners of a mouth.

According to another example embodiment, a user authentication method includes extracting a facial landmark from a first input image; generating a first sparse code for the facial landmark using a first feature vector set generated based on learning data, generating a transformed sparse code for the facial landmark using a second feature vector set generated based on a second input image and the learning data; and determining whether a user is to be authenticated, based on the first sparse code generated using the first feature vector set and the transformed sparse code.

Example embodiments provide that the generating the first sparse code may include generating a first feature vector for the extracted facial landmark based on an area surrounding the facial landmark; and generating the first sparse code for the facial landmark using the first feature vector set and the generated first feature vector.

Example embodiments provide that the extracting extracts a plurality of facial landmarks. Example embodiments provide that the generating the first sparse code may include generating the first sparse code for each of the plurality of extracted facial landmarks using the first feature vector set for each of the plurality of facial landmarks.

Example embodiments provide that the second feature vector set may include a feature vector included in the first feature vector set and a feature vector generated based on a facial landmark extracted from the second input image.

Example embodiments provide that the determining may include calculating a similarity between the first sparse code generated and the transformed sparse code; determining a final similarity based on the calculated similarity; and determining whether a user represented in the first input image is similar or identical to a user represented in the second input image based on whether the final similarity satisfies a desired condition.

Example embodiments provide that a non-transitory computer-readable medium includes program code that, when executed by a processor, performs functions according to the example embodiments of the user authentication method.

At least one example embodiment relates to a user authentication apparatus.

According to an example embodiment, a user authentication apparatus includes processor that includes a facial landmark extractor configured to extract a facial landmark from each of a first input image and a second input image; the processor includes a sparse code generator configured to generate a first sparse code corresponding to the facial landmark extracted from the first input image, and generate a second sparse code corresponding to the facial landmark extracted from the second input image; and the processor includes a user authenticator configured to determine whether a user is to be authenticated based on the first sparse code and the second sparse code.

Example embodiments provide that, in the generating, the sparse code generator is configured to generate the first sparse code for the facial landmark extracted from the first input image using a first feature vector set, the first feature vector set being generated based on learning data; and generate the second sparse code for the facial landmark extracted from the second input image using a second feature vector set, the second feature vector set being generated based on the learning data.

Example embodiments provide that, in the generating, the sparse code generator is configured to generate a first feature vector for the facial landmark based on an area surrounding the facial landmark; generate the first sparse code for the facial landmark using the first feature vector set and the generated first feature vector; generate a second feature vector for the facial landmark based on an area surrounding the facial landmark; and generate the second sparse code for the facial landmark using the second feature vector set and the generated first feature vector.

Example embodiments provide that the user authenticator may include a similarity calculation unit configured to calculate a similarity between the first sparse code and the second sparse code; a final similarity determiner configured to determine a final similarity based on the calculated similarity; and an authentication determiner configured to determine whether a user represented in the first input image is similar or identical to a user represented in the second input image based on whether the final similarity satisfies a desired condition.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Exemplary embodiments described below are combinations of elements and features of the present invention. The elements or features may be considered selective unless otherwise mentioned. Specific structural and functional details disclosed herein are merely representative for purposes of describing example embodiments. Example embodiments may, however, be embodied in many alternate forms and should not be construed as limited to only the embodiments set forth herein. Each element of feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaces with corresponding constructions of another embodiment.

Accordingly, while example embodiments are capable of various modifications and alternative forms, embodiments thereof are described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order as described. For example, two operations described in succession may in fact be executed substantially concurrently or may sometimes be executed in the reverse order, depending upon the functionality/acts involved.

Specific terms used for the exemplary embodiments of the present invention are provided to aid in understanding of the present invention. These specific terms may be replaced with other terms within the scope and spirit of the present invention. A user authentication method according to example embodiments may be implemented by a user authentication apparatus. The same reference numerals will be used throughout the drawings to refer to the same or like parts.

Figure 1:
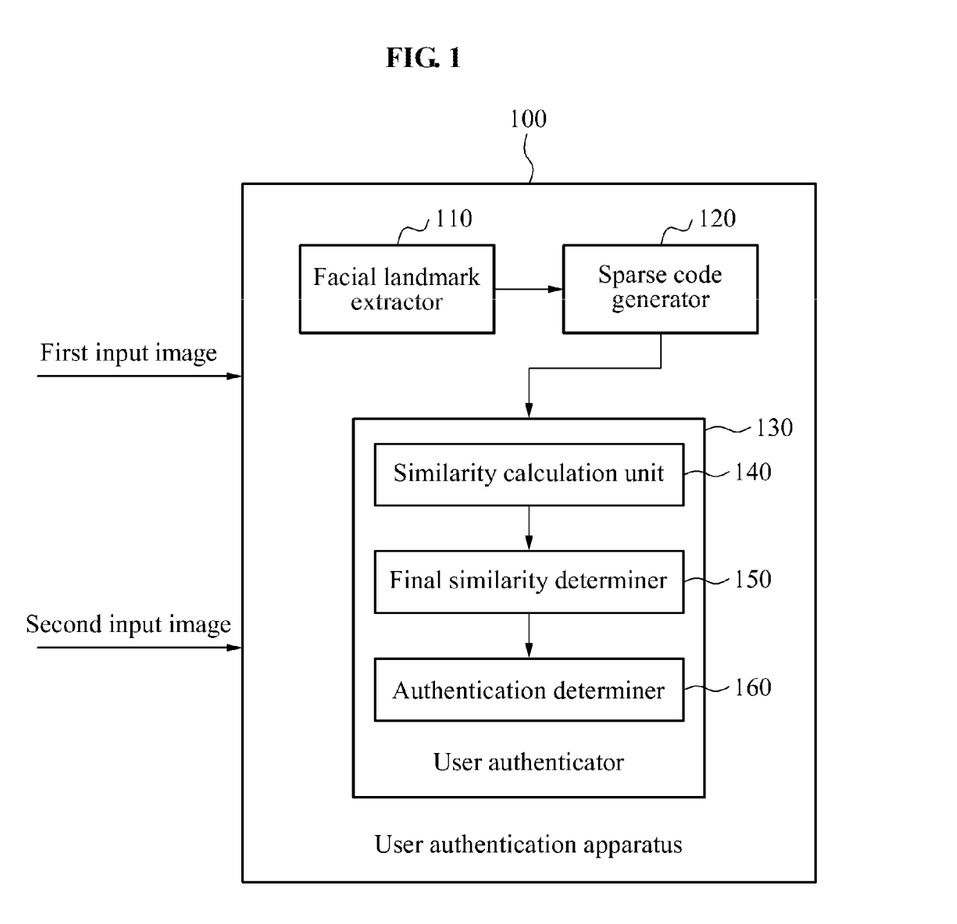
FIG. 1 illustrates a configuration of a user authentication apparatus according to example embodiments.

FIG. 1 illustrates a configuration of a user authentication apparatus 100 according to example embodiments.

The user authentication apparatus 100 may also include one or more processors and one or more data storage devices (not shown). The one or more processors may be special purpose computer processing devices configured to carry out program code stored in the one or more storage devices by performing arithmetical, logical, and input/output operations. For example, the landmark extractor 110, the sparse code generator 120, the user authenticator 130, the similarity calculation unit 140, the final similarity determiner 150, and/or the authentication determiner 160 may be loaded into the one or more processors. Once the landmark extractor 110, the sparse code generator 120, the user authenticator 130, the similarity calculation unit 140, the final similarity determiner 150, and/or the authentication determiner 160 are loaded into the one or more processors, the one or more processors may be configured to perform user authentication according to various example embodiments. The one or more storage devices may be a computer readable storage medium that generally includes a random access memory (RAM), read only memory (ROM), a permanent mass storage device (such as a disk drive), and/or any other like data storage mechanism capable of storing and recording data. The one or more storage devices may be configured to store program code for one or more operating systems and/or program code for one or more software components and/or modules, such as the landmark extractor 110, the sparse code generator 120, the user authenticator 130, the similarity calculation unit 140, the final similarity determiner 150, the authentication determiner 160, and/or other like modules/units. These software components may also be loaded from a separate computer readable storage medium into the one or more storage devices and/or the one or more processors using a drive mechanism (not shown). Such separate computer readable storage medium may include a floppy drive, disc, tape, DVD/CD-ROM drive, memory card, and/or other like computer readable storage medium (not shown). In some embodiments, software components may be loaded into the one or more storage devices and/or the one or more processors from a remote data storage device via a network interface, rather than via a computer readable storage medium. Furthermore, in some embodiments user authentication apparatus 100 may include many more components than those shown in FIG. 1, such as a display device, one or more image sensors, network interface, and/or other like physical hardware components. However, it is not necessary that all of these generally conventional components be shown in order to disclose the example embodiments.

The user authentication apparatus 100 may determine whether a user represented in a first input image is similar or identical to a user represented in a second input image. The user authentication apparatus 100 may calculate a similarity between a face of the user represented in the first input image and a face of the user represented in the second input image, and determine whether the user is to be authenticated based on the similarity. It should be noted that, although the user authentication apparatus 100 may be used to determine whether a user represented in a first input image is similar or identical to a user represented in a second input image, the user authentication apparatus 100 is not limited to recognizing human facial features, and the user authentication apparatus 100 the may be used to determine whether any structure and/or body represented in a first input image is similar or identical to a structure and/or body represented in a second input image.

The user authentication apparatus 100 may perform a user authentication based on a sparse representation coding scheme. The user authentication apparatus 100 may generate a sparse code based on a facial landmark of a user, and determine whether the user represented in the first input image is identical to the user represented in the second input image based on the generated sparse code. A sparse code may be a set of basis vectors such that any given data point can be largely explained by only a few bases from the set. For example, a sparse code may comprise a vector of coefficient of corresponding dictionary items. The user authentication apparatus 100 may extract features of facial landmarks from the first input image and the second input image, and implement a face-based user authentication method in which a user authentication is performed by comparing the extracted features. Also, the user authentication apparatus 100 may implement a user authentication method that may be performed in parallel by using the sparse representation coding scheme for each of the facial landmarks.

The user authentication apparatus 100 may generate a dictionary and/or a feature vector group based on learning data. The leaning data may include data on an objective target. For example, the learning data may include a plurality of learning images representing a face of a user, and the learning images may include images of a similar or identical user and images of a different user. The user authentication apparatus 100 may extract a facial landmark from each of the learning images included in the learning data. The facial landmark may correspond to a local feature including, for example, both ends of an eye, both ends of an eyebrow, a tip of a nose, and both corners of a mouth on a face.

The user authentication apparatus 100 may generate a feature vector based on an area surrounding the facial landmark. The user authentication apparatus 100 may generate the feature vector for each of the extracted feature vector, and generate a feature vector set for each of the facial landmarks. For example, a feature vector set of the tip of the nose may include feature vectors calculated for an area surrounding the tip of the nose in a face represented in each of the learning images. For example, a feature vector set $D_1$ of the tip of the nose may be expressed as shown in Equation 1.

$$D_1 = [v_1^{(1)} v_2^{(1)} v_3^{(1)} v_4^{(1)} \ldots v_m^{(1)}] \quad \text{[Equation 1]}$$

In Equation 1, the feature vector set $D_1$ of the tip of the nose may be indicated by a set of feature vectors including $v_1^{(1)}, v_2^{(1)}, \ldots v_m^{(1)}$ obtained with respect to the area surrounding the tip of the nose extracted from each of the learning images. It should be noted that using equation 1 to express a feature vector for a tip of a nose is merely illustrative, and equation 1 may be used for any portion of a human face, any portion of a human body, and/or any portion of a structure embodied in an image.

The user authentication apparatus 100 may generate a feature vector set for each of the facial landmarks. For example, when k facial landmarks are used, the user authentication apparatus 100 may generate k feature vector sets corresponding to the facial landmarks based on the learning data. The generated feature set may be used to generate a sparse code. For example, the feature vector set for each of the facial landmark may be generated in advance of initiating a user authentication and pre-stored in a storage unit (not shown), for example, a memory. The user authentication apparatus 100 may decode the feature vector set for each of the facial landmarks from the storage unit in case of necessity.

<An Example of the User Authentication Apparatus 100 According to Example Embodiments>

Referring to FIG. 1, the user authentication apparatus 100 may include a facial landmark extractor 110, a sparse code generator 120, and a user authenticator 130. The user authentication apparatus 100 may perform a user authentication by comparing a first input image and a second input image. The user authentication apparatus 100 may determine whether a user represented in the first input image is identical to a user represented in the second input image, based on a similarity between a sparse code generated from the first input image and a sparse code generated from the second input image. A similarity between the sparse codes may indicate a degree of a similarity between the sparse codes.

The facial landmark extractor 110 may extract the facial landmark from each of the first input image and the second input image. The facial landmark extractor 110 may extract the facial landmark, for example, both ends of an eye, both ends of an eyebrow, a tip of a nose, and both corners of a mouth on a face of the user represented in each of the first input image and the second input image.

The sparse code generator 120 may generate the sparse code of the facial landmark for each of the first input image and the second input image. The sparse code generator 120 may generate the sparse code corresponding to the facial landmark extracted from the first input image, and generate the sparse code corresponding to the facial landmark extracted from the second input image.

The sparse code generator 120 may generate the feature vector for the facial landmark based on an area surrounding the extracted facial landmark. For example, when a facial landmark of a tip of a nose is extracted from the first input image, the sparse code generator 120 may generate a feature vector for the tip of the nose based on an area surrounding the tip of the nose. Subsequently, the sparse code generator 120 may generate the sparse code for the facial landmark using the feature vector and a feature vector set generated based on learning data.

The sparse code generator 120 may generate the sparse code for the facial landmark using the feature vector set corresponding to the facial landmark. For example, when the facial landmark of the tip of the nose is extracted from the first input image, the sparse code generator 120 may generate the sparse code for the facial landmark of the tip of the nose extracted from the first input image using the feature vector set corresponding to the tip of the nose. Here, the feature vector set corresponding to the tip of the nose may include feature vectors generated based on the area surrounding the tip of the nose on a face of a user represented in a plurality of learning images. The sparse code generator 120 may generate the sparse code for the facial landmark through parallel processing. For example, the sparse code generator 120 may simultaneously generate the sparse code of the tip of the nose and a sparse code of an end of an eye.

As an example, the sparse code generator 120 may generate the sparse code for the facial landmark through $l_1$ minimization as shown in Equation 2.

$$\hat{x}^{(i)} = \arg\min_x \|y^{(i)} - A_i x\|_2^2 + \lambda \|x\|_1 \qquad \text{[Equation 2]}$$

In Equation 2, $A_1$ denotes a feature vector set corresponding to a facial landmark i, and $y^{(i)}$ denotes a feature vector generated in an area surrounding the facial landmark i of an input image. $\hat{x}^{(i)}$ denotes a sparse code of the facial landmark i, $\lambda$ denotes a parameter used to control a result of the $l_1$ minimization.

The sparse code generator 120 may generate a sparse code for corresponding facial landmarks among the facial landmarks extracted from the first input image and the facial landmarks extracted from the second input image. For example, when the facial landmarks extracted from the first input image are the tip of the nose, both corners of a mouth, both ends of the eyes, and both ends of an eyebrow, and the facial landmarks extracted from the second input image are both ends of an eye and both ends of an eyebrow, the sparse code generator 120 may generate sparse codes for the facial landmarks of the both ends of the eye and the both ends of the eyebrow identically obtained from the first input image and the second input image. Thus, although the face of the user included in the first input image or the second input image is hidden or distorted, the user authentication apparatus 100 may perform a user authentication based on remaining extractable facial landmarks.

The user authenticator 130 may determine whether the user is to be authenticated based on the sparse code of the first input image and the spare code of the second input image. The user authenticator 130 may determine whether the user represented in the first input image is identical to the user represented in the second input image, based on a similarity between the sparse code of the first input image and the sparse code of the second input image. Hereinafter, descriptions about an operation of the user authenticator 130 will be provided.

The user authenticator 130 may include a similarity calculation unit 140, a final similarity determiner 150, and an authentication determiner 160.

The similarity calculation unit 140 may calculate, for each of the facial landmarks, the similarity between the sparse code of the facial landmark included in the first input image and the sparse code of the facial landmark included in the second input image. For example, the similarity calculation unit 140 may calculate a similarity between the sparse code of the tip of the nose generated from the first input image and a sparse code of a tip of a nose generated from the second input image. The similarity calculation unit 140 may calculate the similarity between the sparse code of the facial landmark included in the first input image and the sparse code of the facial landmark included in the second input image through a cosine distance measurement or a chi-square distance measurement.

The final similarity determiner 150 may determine a final similarity based on the similarity between the facial landmarks generated from the first input image and the facial landmarks generated from the facial landmarks generated from the second input image. When the similarity calculation unit 140 calculates the similarity among sparse codes of a plurality of landmarks, the final similarity determiner 150 may determine the final similarity by combining the calculated similarities among the sparse codes. For example, the final similarity determiner 150 may determine the final similarity based on, for example, a sum of the similarities among the sparse codes, a weighted sum of the similarities among the sparse codes, and the like.

The authentication determiner 160 may determine whether the user represented in the first input image is identical to the user represented in the second input image, based on whether the final similarity determined by the final similarity determiner 150 satisfies a desired (or alternatively "predetermined") condition. For example, when the final similarity is greater than a desired (or alternatively "predetermined") threshold, the authentication determiner 160 may determine that the user represented in the first input image is identical to the user represented in the second input image. When the final similarity is less than or equal to the desired threshold, the authentication determiner 160 may determine that the user represented in the first input image is different from the user represented in the second input image.

When the face of the user represented in the first input image is identical or similar to the face of the user represented in the second input image, the similarity between the sparse code of the facial landmark included in the first input image and the sparse code of the facial landmark included in the second input image may be relatively high. Conversely, when the user represented in the first input image is different from the user represented in the second input image and a feature difference between the faces is relatively high, the similarity between the sparse code of the first input image and the sparse code of the second input image may be relatively low. The final similarity between the first input image and the second input image may increase according to an increase in the similarity between the face of the user represented in the first input image and the face of the user represented in the second input image.

<Another Example of the User Authentication Apparatus 100 According to Example Embodiments>

Referring to FIG. 1, the user authentication apparatus 100 may include a facial landmark extractor 110, a sparse code generator 120, and a user authenticator 130. The user authentication apparatus 100 may generate a sparse code for a first input image using a first feature vector set generated based on learning data. The user authentication apparatus 100 may generate a transformed sparse code for the first input image based on a second input image. For example, the user authentication apparatus 100 may generate a second feature vector set by adding a feature vector to the first feature vector set, and generate the transformed sparse code for the first input image using the second feature vector set. For example, the second feature vector set may additionally include the feature vector of the second input image based on the feature vectors included in the first feature vector set.

Subsequently, the user authentication apparatus 100 may determine whether a user represented in the first input image is identical to a user represented in the second input image based on a similarity between the sparse code generated from the first feature vector set and the transformed sparse code generated from the second feature vector set.

The user authentication apparatus 100 may (1) use the feature vector of the second input image as an element of a feature vector set used to generate the sparse code and perform a user authentication based on a similarity among the sparse codes of the first input image, and (2) use the feature vector of the first input image as an element of the feature vector set used to generate the sparse code and perform the user authentication based on a similarity among the sparse codes of the second input image. Since an operation of a case (1) is identical to an operation of a case (2), descriptions about the case (1) will be provided to enhance ease of understanding and convenience of description. However, the user authentication apparatus 100 may perform an operation of the case (2) using a similar or an identical method of performing the operation of the case (1), and perform the operation of the case (1) and the operation of the case (2) depending on particular circumstances.

The facial landmark extractor 110 may extract a facial landmark from the first input image. As an example, the facial landmark extractor 110 may extract the facial landmark, for example, both ends of an eye, both ends of an eyebrow, a tip of a nose, and both corners of a mouth from a face of the user represented in the first input image.

The sparse code generator 120 may generate the sparse code for the facial landmark extracted from the first input image using the first feature vector set generated based on the learning data. The sparse code generator 120 may generate the sparse code corresponding to the facial landmark extracted from the first input image.

The sparse code generator 120 may generate the feature vector for the facial landmark based on an area surrounding the facial landmark extracted from the first input image. Subsequently, the sparse code generator 120 may generate the sparse code for the facial landmark extracted from the first input image using the first feature vector set generated based on the learning data. The sparse code generator 120 may generate the sparse code for each facial landmark using the feature vector and the first feature vector set corresponding to each facial landmark. For example, the sparse code generator 120 may generate the sparse code for each facial landmark using Equation 2.

The sparse code generator 120 may generate the transformed sparse code for the facial landmark extracted from the first input image using the second feature vector set generated based on the leaning data and the second input image. The sparse code generator 120 may generate the transformed sparse code for each facial landmark using the second feature vector set corresponding to each facial landmark. The second feature vector set may include the feature vector for the facial landmark extracted from the second input image along with elements of the first feature vector set.

When the second input image is input to the user authentication apparatus 100, the second feature vector set may be generated based on the leaning data and the second input image. The sparse code generator 120 may generate the second feature vector set by adding the feature vector of the facial landmark extracted from the second input image to the first feature vector set generated based on the learning data. For example, when a first feature vector set is generated for the tip of the nose based on the learning data, the sparse code generator 120 may generate the second feature vector set by adding a feature vector of the tip of the nose extracted from the second input image, to the first feature vector set of the tip of the nose.

As an example, when Equation 3 indicates the first feature vector set generated based on the learning data, the second feature vector set generated based on the learning data and the second image may be indicated as shown in Equation 4.

$$A_i = [v_1^{(i)} v_2^{(i)} v_3^{(i)} v_4^{(i)} \ldots v_m^{(i)}]$$ [Equation 3]

In Equation 3, $A_i$ denotes the first feature vector set for a facial landmark i, and $v_1^{(i)}, v_2^{(i)}, \ldots, v_m^{(i)}$ denote feature vectors for the facial landmark i generated based on the learning data.

$$A_{Bi} = [v_1^{(i)} v_2^{(i)} v_3^{(i)} v_4^{(i)} \ldots v_m^{(i)} v_B^{(i)}]$$ [Equation 4]

In Equation 4, $A_{Bi}$ denotes the second feature vector set of the facial landmark i, and $v_1^{(i)}, v_2^{(i)}, \ldots, v_m^{(i)}$ denote the feature vectors of the facial landmark i generated based on the learning data. $v_B^{(i)}$ denotes the feature vector of the facial landmark i extracted from the second input image.

For example, the sparse code generator 120 may generate the transformed sparse code for each facial landmark based on Equation 5.

$$\hat{x}^{(i)} = \arg\min_x \|y^{(i)} - A_{Bi} x\|_2^2 + \lambda \|x\|_1$$ [Equation 5]

In Equation 5, $A_{Bi}$ denotes the second feature vector set corresponding to the facial landmark i, and $y^{(i)}$ denotes the feature vector generated based on an area surrounding the facial landmark i of the first input image. $\hat{x}^{(i)}$ denotes the transformed sparse code of the facial landmark i of the first input image, and $\lambda$ denotes a parameter used to control a result of l1 minimizition.

The user authenticator 130 may determine whether the user is to be authenticated, based on independent sparse codes of the first input image. For example, the user authenticator 130 may determine whether the user is to be authenticated by comparing the sparse codes of the first input image generated based on the first feature vector set and the sparse code of the first input image generated based on the second feature vector set. Hereinafter, the sparse code of the first input image generated based on the second feature vector set may also be referred to as the transformed sparse code.

The user authenticator 130 may determine whether the user represented in the first input image is identical to the user represented in the second input image, based on a similarity between the sparse code generated based on the first feature vector set and the transformed sparse code. The transformed sparse code of the first input image may be determined based on the feature vector of the second input image, as well as a feature vector generated based on the learning data. A difference between the sparse code generated based on the first feature vector set and the transformed sparse code may indicate a degree of a similarity between the first input image and the second input image. Hereinafter, descriptions about an operation of the user authenticator 130 will be provided.

The user authenticator 130 may include a similarity calculation unit 140, a final similarity determiner 150, and an authentication determiner 160.

The similarity calculation unit 140 may calculate a similarity between the sparse code generated based on the first feature vector set and the transformed sparse code for each facial landmark. The similarity calculation unit 140 may calculate the similarity between the sparse code generated based on the first feature vector set and the transformed sparse code through a cosine distance measurement or a chi-square distance measurement. The cosine distance measurement may be a measure of similarity between two vectors of an inner product space based on the cosine of an angle between the two vectors. The chi-square distance measurement may be a measure of similarity between two vectors based on a squared difference between each of the two vectors, where each squared difference is weighted by the inverse of the frequency corresponding to each of the two vectors. The similarity calculation unit 140 may calculate a similarity between the sparse codes generated based on the first vector set and the transformed sparse codes for each facial landmark.

The final similarity determiner 150 may determine a final similarity based on the similarity between the sparse code generated based on the first feature vector set and the transformed sparse code. When the similarity calculation unit 140 calculates the similarity between the sparse code generated based on the first feature vector set and the transformed sparse code for a plurality of landmarks, the final similarity determiner may determine the final similarity by combining the calculated similarities. For example, the final similarity determiner 150 may determine the final similarity based on a method of calculating a sum or a weighted sum of the calculated similarities.

The authentication determiner 160 may determine whether the user represented in the first input image is identical to the user represented in the second input image based on whether the final similarity satisfies a desired condition. For example, when the final similarity is greater than a desired threshold, the authentication determiner 160 may determine that the user represented in the first input image is different from the user represented in the second input image. When the final similarity is less than or equal to the desired threshold, the authentication determiner 160 may determine that the user represented in the first input image is identical to the user represented in the second input image.

When the face of the user represented in the first input image is identical or similar to the face of the user represented in the second input image, the similarity between the sparse code of the facial landmark included in the first input image and the sparse code of the facial landmark included in the second input image may be relatively high. Conversely, when the user represented in the first input image is different from the user represented in the second input image and a feature difference between the faces is relatively high, the similarity between the sparse code of the first input image and the sparse code of the second input image may be relatively low. The final similarity between the first input image and the second input image may increase according to an increase in the similarity between the face of the user represented in the first input image and the face of the user represented in the second input image.

Figure 2:
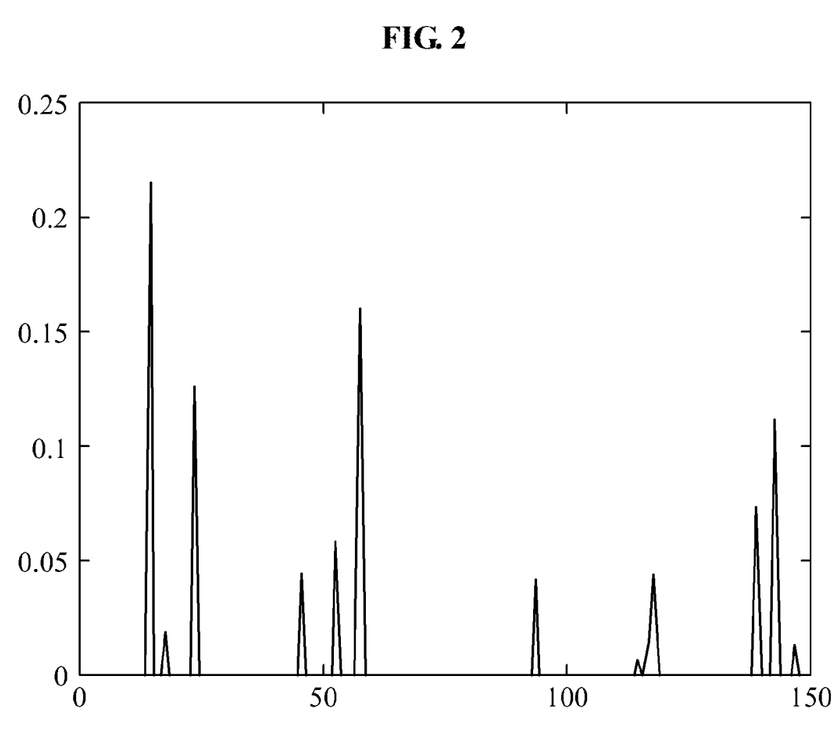
FIG. 2 illustrates an example of a sparse code for a facial landmark according to example embodiments.

FIG. 2 illustrates an example of a sparse code for a facial landmark according to example embodiments.

Referring to FIG. 2, an example of a sparse code generated based on Equation 2 is illustrated. The sparse code may be indicated in a form of a histogram with reference to FIG. 2. For example, the sparse code may be expressed through a linear combination of partial learning images of learning images included in learning data. In the histogram of FIG. 2, an x-axis denotes an index of learning images included in a feature vector set, and a y-axis denotes a proportion of each of the learning images in the sparse code. According to example embodiments, a feature vector of the first input image or the second input image input to a user authentication apparatus may be an element of the sparse code.

Figure 3:
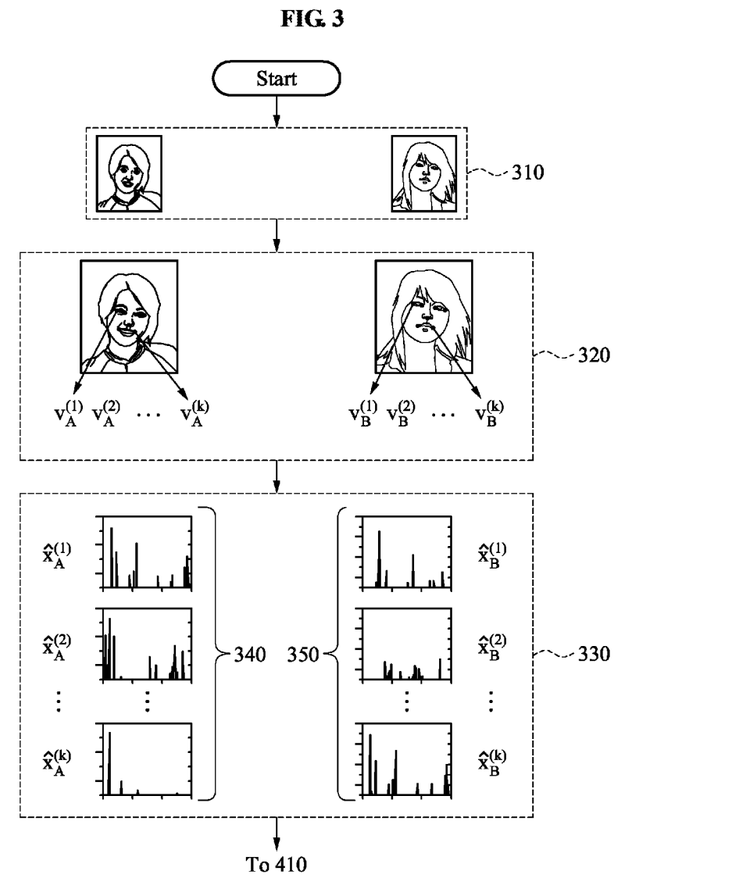
FIGS. 3 and 4 illustrate an example of a user authentication method according to example embodiments.
Figure 4:
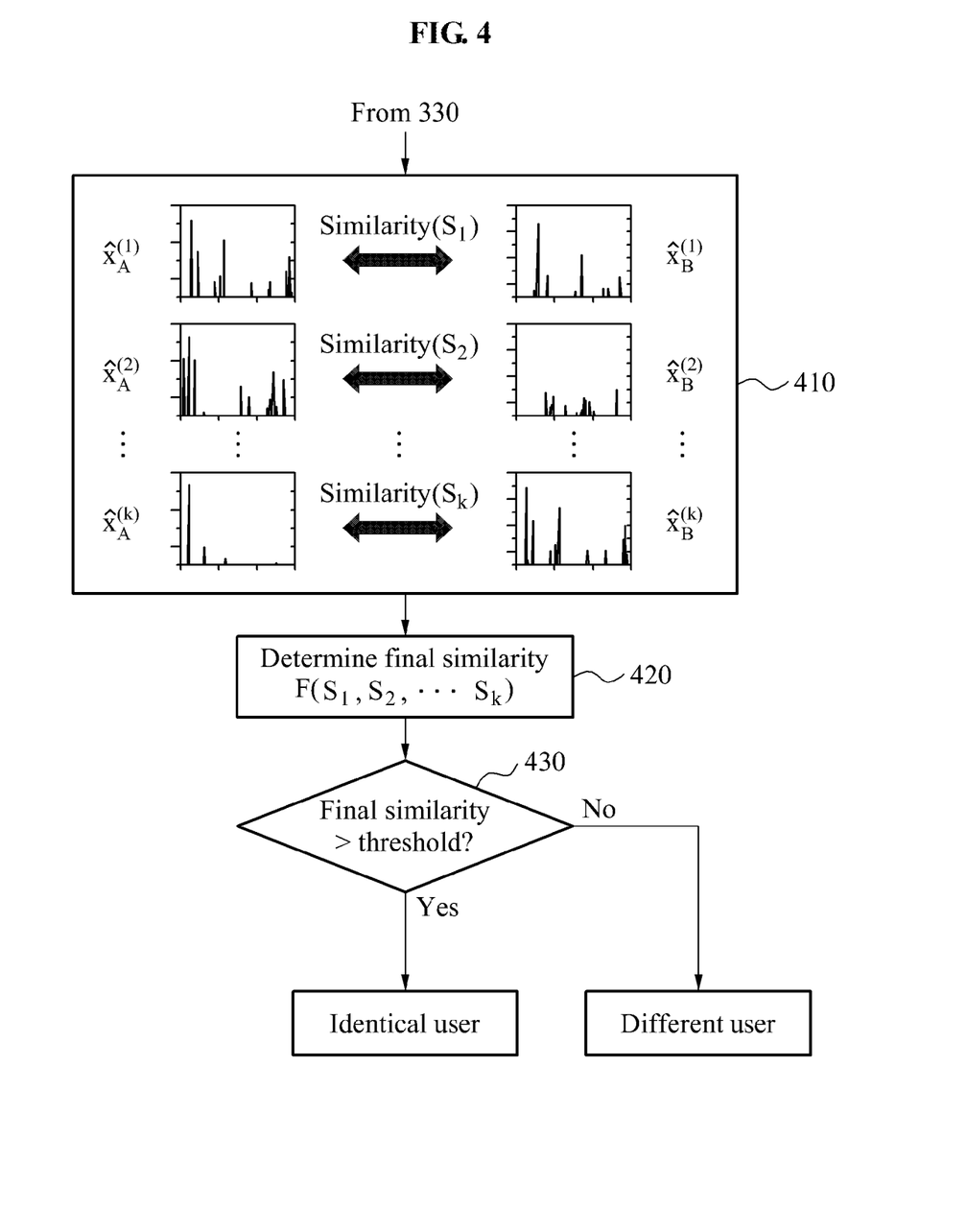

FIGS. 3 and 4 illustrate an example of a user authentication method according to example embodiments. For illustrative purposes, the operations of the user authentication method as shown in FIGS. 3 and 4 will be described as being performed by user authentication apparatus 100. However, it should be noted that any computing device that is the same or similar to user authentication apparatus 100 may operate the user authentication method of FIGS. 3 and 4 as described below. The user authentication apparatus 100 may determine whether users represented in two input images correspond to an identical user.

In operation 310, the user authentication apparatus 100 may receive two input images, each representing a face. The two input images may be received serially or in parallel.

In operation 320, the user authentication apparatus 100 may extract a facial landmark from each of the two input images, and generate a feature vector for each facial landmark. The user authentication apparatus 100 may detect landmark points from each of the two input images, and generate a feature vector for an area surrounding the detected landmark points. For example, the user authentication apparatus 100 may generate a feature vector $v_A^{(1)}$ of a left end of an eye and a feature vector $v_A^{(2)}$ of a right end of the eye from an input image A. Similarly, the user authentication apparatus 100 may generate a feature vector $v_B^{(1)}$ of a left end of an eye and a feature vector $v_B^{(2)}$ of a right end of an eye from an input image B.

In operation 330, the user authentication apparatus 100 may generate sparse codes 340 and 350 with respect to each of the two input images. The user authentication apparatus 100 may generate the sparse code for each facial landmark using the feature vector set generated based on learning data. For example, the user authentication apparatus 100 may generate a sparse code $\hat{x}_A^{(1)}$ of a left end of an eye and a sparse code $\hat{x}_A^{(2)}$ of a right end of an eye from an input image A. Similarly, the user authentication apparatus 100 may generate a sparse code $\hat{x}_B^{(1)}$ of the left end of the eye and a sparse code $\hat{x}_B^{(2)}$ of the right end of the eye from the input image B. The sparse code for each facial landmark may be generated through parallel processing.

In operation 410, the user authentication apparatus 100 may calculate a similarity between the sparse codes for each facial landmark. For example, the user authentication apparatus 100 may calculate a similarity $S_1$ between the sparse code $\hat{x}_A^{(1)}$ of the left end of the eye of the input image A and the sparse code $\hat{x}_B^{(1)}$ of the right end of the eye of the input image A, and calculate a similarity $S_2$ between the sparse code $\hat{x}_A^{(2)}$ of the right end of the eye of the input image A and the sparse code $\hat{x}_B^{(2)}$ of the right end of the eye of the input image B. The user authentication apparatus 100 may calculate a similarity $S_1$, a similarity $S_2$, ... a similarity $S_k$ among the sparse codes corresponding to each facial landmark. The similarities among the sparse codes corresponding to each facial landmark may be calculated through parallel processing.

In operation 420, the user authentication apparatus 100 may determine a final similarity by combining the similarity $S_1$, the similarity $S_2$, ... the similarity $S_k$ among the sparse codes corresponding to each facial landmark. For example, the user authentication apparatus 100 may determine a weighted value to be applied to the similarity for each facial landmark based on a number of landmarks extracted from the input image and a type of the extracted facial landmark, and determine the final similarity by calculating a sum of the similarities to which the weighted values are applied.

In operation 430, the user authentication apparatus 100 may determine whether the users represented in the two input images correspond to an identical user by comparing the final similarity and a desired threshold. For example, when the user authentication apparatus 100 may determines that the final similarity is greater than the desired threshold, the user authentication apparatus 100 may determine that the users represented in the two input images correspond to the identical user. When the user authentication apparatus 100 may determines that the final similarity is less than or equal to the desired threshold, the user authentication apparatus 100 may determine that the users represented in the two input images correspond to different users.

Figure 5:
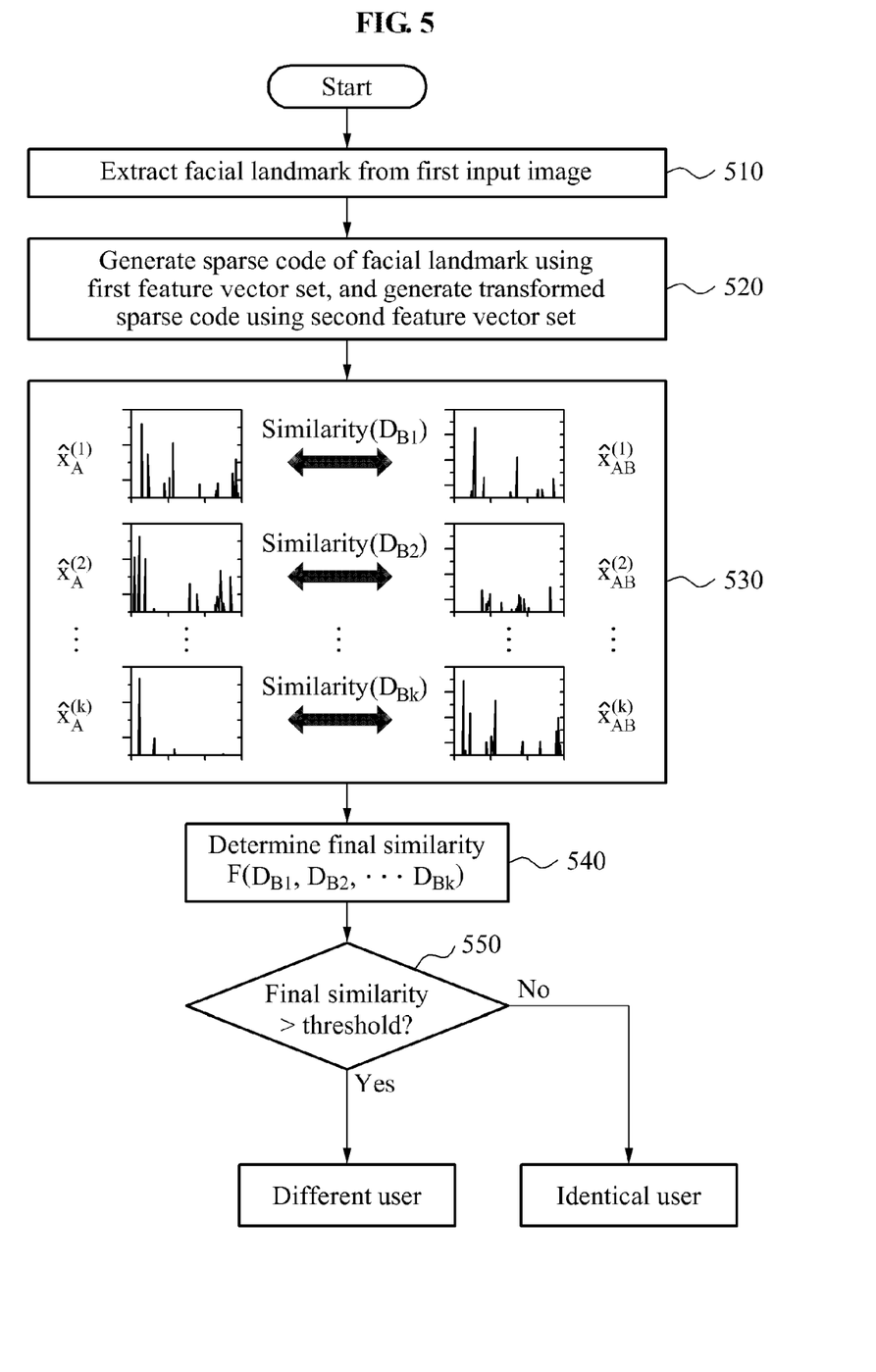
FIG. 5 illustrates another example of a user authentication method according to example embodiments.

FIG. 5 illustrates another example of a user authentication method according to example embodiments. For illustrative purposes, the operations of the user authentication method as shown in FIG. 5 will be described as being performed by user authentication apparatus 100. However, it should be noted that any computing device that is the same or similar to user authentication apparatus 100 may operate the user authentication method of FIG. 5 as described below.

In operation 510, the user authentication apparatus 100 may extract a facial landmark from a first input image.

In operation 520, the user authentication apparatus 100 may generate a sparse code for the facial landmark extracted from the first input image using a first feature vector set, and generate a transformed sparse code for the facial landmark extracted from the first input image using a second feature vector set. The first feature vector set may be generated based on learning data, and the second feature vector set may be generated based on the learning data and the second input image. The second feature vector set existing for each facial landmark may include a feature vector of a facial landmark extracted from the second input image, as well as a feature vector included in the first feature vector set. For example, a second feature vector set of a tip of a nose may include feature vectors of a tip of a nose included in the first feature vector set and feature vectors of the tip of the nose extracted from the second input image.

In operation 530, the user authentication apparatus 100 may calculate a similarity between a transformed sparse code and the sparse code generated based on the first feature vector set for each facial landmark. For example, the user authentication apparatus may calculate a similarity $D_{B1}$, a similarity $D_{B2}$, ..., a similarity $D_{BK}$ among a sparse code $\hat{x}_A^{(1)}$, a sparse code $\hat{x}_A^{(2)}$, ..., a sparse code $\hat{x}_A^{(k)}$ generated based on the first feature vector set and a transformed sparse code $\hat{x}_{AB}^{(1)}$, a transformed sparse code $\hat{x}_{AB}^{(2)}$, ..., a transformed sparse code $\hat{x}_{AB}^{(k)}$ for each facial landmark. Each of the similarity $D_{B1}$, the similarity $D_{B2}$, ..., the similarity $D_{BK}$ may indicate a similarity between the transformed sparse code and the sparse code generated based on the first feature vector set corresponding to each facial landmark.

In operation 540, the user authentication apparatus 100 may determine a final similarity by combining the similarity $D_{B1}$, the similarity $D_{B2}$, ..., the similarity $D_{BK}$ corresponding to each facial landmark.

In operation 550, the user authentication apparatus 100 may determine whether users represented in two input images correspond to an identical user by comparing the final similarity and a desired threshold. For example, when the user authentication apparatus 100 determines that the final similarity is greater than the desired threshold, the user authentication apparatus 100 may determine that the users represented in the two input images correspond to different users. When the user authentication apparatus 100 determines that the final similarity is less than or equal to the desired threshold, the user authentication apparatus 100 may determine that the users represented in the two input images correspond to an identical user.

Figure 6:
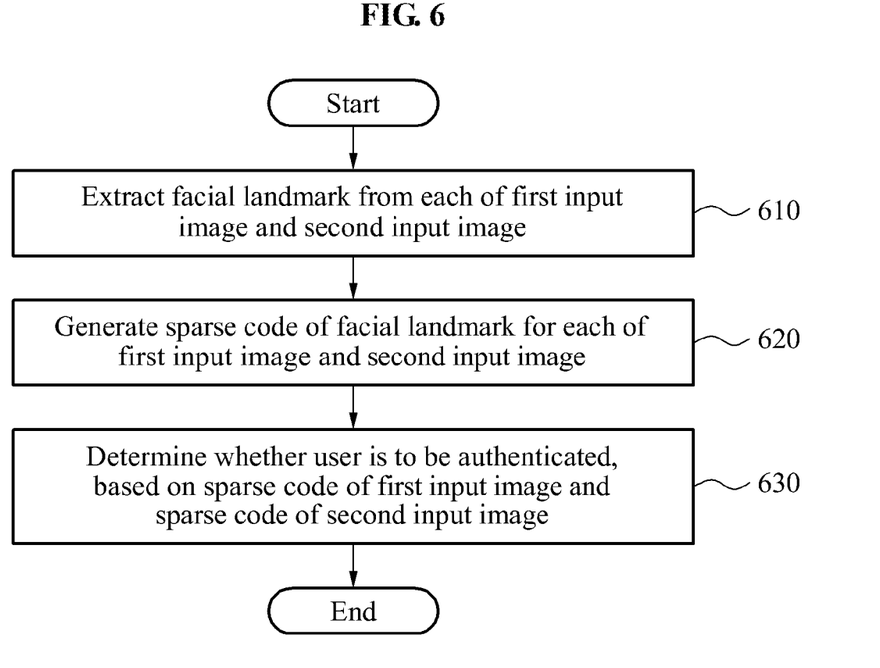
FIG. 6 illustrates an example of an operation of a user authentication method according to example embodiments.

FIG. 6 illustrates an example of an operation of a user authentication method according to example embodiments. For illustrative purposes, the operations of the user authentication method as shown in FIG. 6 will be described as being performed by user authentication apparatus 100. However, it should be noted that any computing device that is the same or similar to user authentication apparatus 100 may operate the user authentication method of FIG. 6 as described below.

In operation 610, a user authentication apparatus 100 may extract a facial landmark, for example, both ends of an eye, both ends of an eyebrow, a tip of a nose, and both corners of a mouth from each of a first input image and a second input image.

In operation 620, the user authentication apparatus 100 may generate a sparse code of the facial landmark for each of the first input image and the second input image. The user authentication apparatus 100 may generate a feature vector of the facial landmark based on an area surrounding the facial landmark. The user authentication apparatus 100 may generate the sparse code for the facial landmark extracted from each of the first input image and the second input image using a feature vector set generated based on learning data. The user authentication apparatus 100 may generate a sparse code for each facial landmark using a feature vector set corresponding to the facial landmark. The sparse code may be expressed in a form in which partial learning images of learning images included in the learning data are linearly combined.

In operation 630, the user authentication apparatus 100 may determine whether the user is to be authenticated, based on the sparse code of the first input image and the sparse code of the second input image. The user authentication apparatus 100 may calculate a similarity between the sparse code of the facial landmark included in the first input image and the sparse code of the facial landmark included in the second input image for each facial landmark. The user authentication apparatus 100 may determine a final similarity by combining similarities among sparse codes, and determine whether the user represented in the first input image is identical to the user represented in the second input image, based on whether the final similarity satisfies a desired condition.

Figure 7:
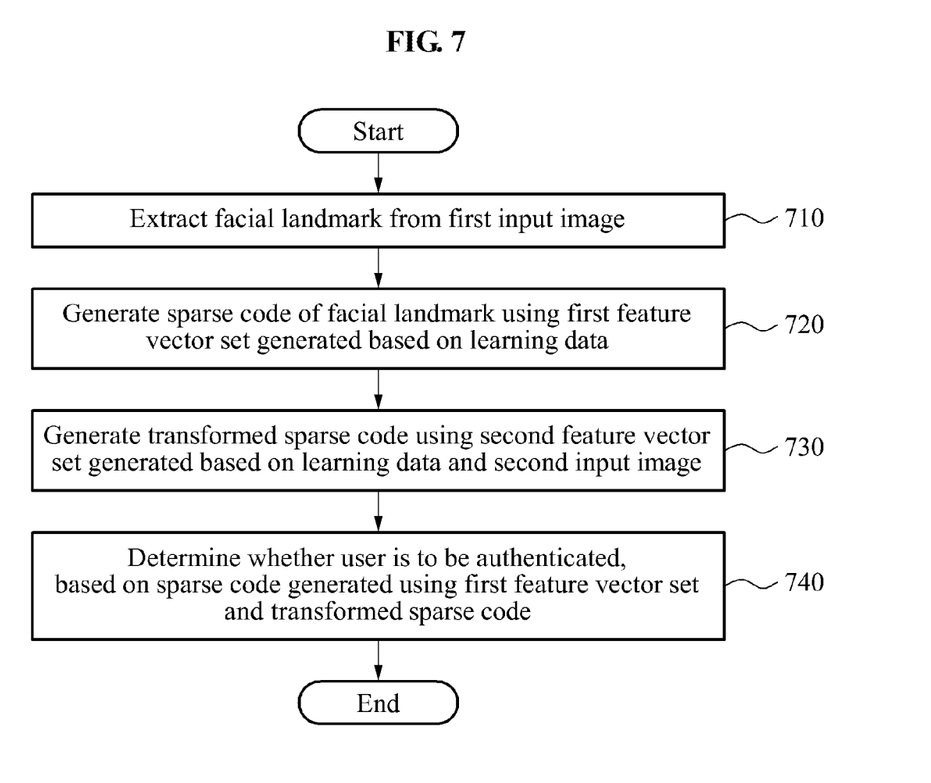
FIG. 7 illustrates another example of an operation of a user authentication method according to example embodiments.

FIG. 7 illustrates another example of an operation of a user authentication method according to example embodiments. For illustrative purposes, the operations of the user authentication method as shown in FIG. 7 will be described as being performed by user authentication apparatus 100. However, it should be noted that any computing device that is the same or similar to user authentication apparatus 100 may operate the user authentication method of FIG. 7 as described below.

In operation 710, the user authentication apparatus 100 may extract a facial landmark from a first input image.

In operation 720, the user authentication apparatus 100 may generate a sparse code for the facial landmark extracted from the first input image based on a first feature vector set generated based on learning data. The user authentication apparatus 100 may generate the sparse code corresponding to each facial landmark extracted from the first input image. The user authentication apparatus 100 may generate a feature vector for each facial landmark based on an area surrounding the facial landmark extracted from the first input image, and generate the sparse code using the feature vector generated for each facial landmark and the first feature vector set existing for each facial landmark.

In operation 730, the user authentication apparatus 100 may generate a transformed sparse code for the facial landmark extracted from the first input image using the second feature vector set generated based on the learning data and the second input image. The second feature vector set may include a feature vector included in the first feature vector set and a feature vector of a facial landmark extracted from the second input image. The user authentication apparatus 100 may generate a transformed sparse code using the feature vector generated for each facial landmark and the second feature vector set existing for each facial landmark.

In operation 740, the user authentication apparatus 100 may determine whether the user is to be authenticated, based on the sparse code generated using the first feature vector set and the transformed sparse code. The user authentication apparatus 100 may calculate a similarity between the transformed sparse code and the sparse code generated based on the first feature vector set for each facial landmark. The user authentication apparatus 100 may determine a final similarity by combining similarities between the transformed sparse code and the sparse code generated based on the first feature vector set, and determine whether the user represented in the first input image is identical to the user represented in the second input image, based on whether the final similarity satisfies a desired condition.

The methods according to the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, other implementations, alternative embodiments and equivalents to the claimed subject matter are construed as being within the appended claims.

What is claimed is:

1. A user authentication method comprising:
   extracting, by a processor, a facial landmark from each of a first input image and a second input image;
   generating, by the processor, a first sparse code of the facial landmark extracted from the first input image and a second sparse code of the facial landmark extracted from the second input image; and determining, by the processor, whether a user is to be authenticated based on the first sparse code of the first input image and the second sparse code of the second input image, the determining including,
calculating a similarity between the first sparse code and the second sparse code,
determining a final similarity based on the calculated similarity, and
determining whether a user represented in the first input image is similar to a user represented in the second input image based on whether the final similarity satisfies a desired condition.

2. The method of claim 1, wherein the generating comprises:
determining a first feature vector set associated with the facial landmark extracted from the first input image and a second feature vector set associated with the facial landmark extracted from the second input image, the first feature vector set and the second feature vector set being generated based on learning data.

3. The method of claim 2, wherein the generating further comprises:
generating the first sparse code using the first feature vector set; and
generating the second sparse code using the second feature vector set.

4. The method of claim 2, wherein the generating further comprises:
generating a first feature vector for the facial landmark extracted from the first input image based on an area surrounding the facial landmark;
generating a second feature vector for the facial landmark extracted from the second input image based on an area surrounding the facial landmark;
generating the first sparse code for the facial landmark extracted from the first input image using the first feature vector set and the generated first feature vector; and
generating the second sparse code for the facial landmark extracted from the second input image using the second feature vector set and the generated second feature vector.

5. The method of claim 1, wherein the extracting extracts a plurality of facial landmarks from the first input image and the second input image, and the generating comprises:
generating the first sparse code for each of the plurality of facial landmarks extracted from the first input image; and
generating the second sparse code for each of the plurality of facial landmarks extracted from the second input image.

6. The method of claim 1, wherein the calculating comprises:
calculating the similarity between the first sparse code and the second sparse code through one of a cosine distance measurement and a chi-square distance measurement.

7. The method of claim 1, wherein the facial landmark comprises at least one of both ends of an eye, both ends of an eyebrow, a tip of a nose, and both corners of a mouth.

8. A non-transitory computer-readable medium storing program code that, which when executed by a processor, configures the processor to performs the method of claim 1.

9. A user authentication method comprising:
extracting, by a processor, a facial landmark from a first input image;
generating, by the processor, a first sparse code for the facial landmark using a first feature vector set generated based on learning data;
generating, by the processor, a transformed sparse code for the facial landmark using a second feature vector set generated based on a second input image and the learning data, the second feature vector set including a feature vector included in the first feature vector set, the feature vector generated based on a facial landmark extracted from the second input image; and
determining, by the processor, whether a user is to be authenticated based on the first sparse code generated using the first feature vector set and the transformed sparse code.

10. The method of claim 9, wherein the generating the first sparse code comprises:
generating a first feature vector for the extracted facial landmark based on an area surrounding the facial landmark; and
generating the first sparse code for the facial landmark using the first feature vector set and the generated first feature vector.

11. The method of claim 9, wherein the extracting extracts a plurality of facial landmarks, and the generating the first sparse code comprises:
generating the first sparse code for each of the plurality of extracted facial landmarks using the first feature vector set for each of the plurality of facial landmarks.

12. The method of claim 9, wherein the determining comprises:
calculating a similarity between the first sparse code generated and the transformed sparse code;
determining a final similarity based on the calculated similarity; and
determining whether a user represented in the first input image is similar to a user represented in the second input image based on whether the final similarity satisfies a desired condition.

13. A user authentication apparatus comprising:
at least one processor configured to,
extract a facial landmark from each of a first input image and a second input image,
generate a first sparse code corresponding to the facial landmark extracted from the first input image,
generate a second sparse code corresponding to the facial landmark extracted from the second input image, and
determine whether a user is to be authenticated based on the first sparse code and the second sparse code by,
calculating a similarity between the first sparse code and the second sparse code,
determining a final similarity based on the calculated similarity, and
determining whether a user represented in the first input image is similar to a user represented in the second input image, based on whether the final similarity satisfies a desired condition.

14. The apparatus of claim 13, wherein:
the at least one processor is configured to generate the first sparse code for the facial landmark extracted from the first input image using a first feature vector set, the first feature vector set generated based on learning data; and
the at least one processor is configured to generate the second sparse code for the facial landmark extracted from the second input image using a second feature vector set, the second feature vector set generated based on the learning data.

15. The apparatus of claim 14, wherein:

the at least one processor is further configured to generate a first feature vector for the facial landmark based on an area surrounding the facial landmark;

the at least one processor is configured to generate the first sparse code for the facial landmark using the first feature vector set and the generated first feature vector;

the at least one processor is further configured to generate a second feature vector for the facial landmark based on an area surrounding the facial landmark; and the at least one processor is configured to generate the second sparse code for the facial landmark using the second feature vector set and the generated first feature vector.

* * * * *